United States Patent [19]
Colt

[11] Patent Number: 5,258,064
[45] Date of Patent: Nov. 2, 1993

[54] INK COMPOSITIONS AND PREPARATION PROCESSES THEREOF

[75] Inventor: Richard L. Colt, Rochester, N.Y.

[73] Assignee: Xerox Corporation, Stamford, Conn.

[21] Appl. No.: 992,240

[22] Filed: Dec. 17, 1992

[51] Int. Cl.$^5$ ............................................. C09D 11/02
[52] U.S. Cl. ................................ 106/20 R; 106/22 R; 106/22 H; 106/20 D
[58] Field of Search ................ 106/20 R, 22 R, 22 H, 106/20 D

[56] References Cited

U.S. PATENT DOCUMENTS

| | | | |
|---|---|---|---|
| 4,838,940 | 6/1989 | Kan et al. | 106/20 B |
| 4,853,037 | 8/1989 | Johnson et al. | 106/22 |
| 4,920,361 | 4/1990 | Arahara et al. | 106/20 D |
| 5,062,892 | 11/1991 | Halko | 106/22 H |

Primary Examiner—Helene Klemanski
Attorney, Agent, or Firm—Judith L. Byorick

[57] ABSTRACT

Disclosed is a process for preparing an ink composition which comprises (a) forming a mixture by admixing water and a base; (b) adding a colorant to the mixture; and (c) adjusting the pH of the mixture by adding polyphosphoric acid thereto. Also disclosed is a process for preparing an ink composition which comprises (a) forming a mixture by admixing water and polyphosphoric acid; (b) adding a colorant to the mixture; and (c) adjusting the pH of the mixture by adding a base thereto. Further disclosed are ink compositions prepared by these processes. Additionally disclosed are processes which comprises incorporating these inks into an ink jet printing apparatus and causing droplets of the ink to be ejected in an imagewise pattern onto a substrate. The presence of polyphosphoric acid and the base create a buffer system in the ink which adjusts the ink to the desired pH, and also enables improved latency and waterfastness.

15 Claims, No Drawings

INK COMPOSITIONS AND PREPARATION PROCESSES THEREOF

BACKGROUND OF THE INVENTION

The present invention is directed to aqueous ink compositions. More particularly, the present invention is directed to ink compositions suitable for use in ink jet printing processes. One embodiment of the present invention is directed to a process for preparing an ink composition which comprises admixing water, a colorant, a base, and polyphosphoric acid, wherein the pH of the ink is adjusted by a process selected from the group consisting of (a) adding polyphosphoric acid to an aqueous solution containing the base, and (b) adding the base to an aqueous solution containing polyphosphoric acid. Another embodiment of the present invention is directed to a process for preparing an ink composition which comprises (a) forming a mixture by admixing water and a base; (b) adding a colorant to the mixture; and (c) adjusting the pH of the mixture by adding polyphosphoric acid thereto. Yet another embodiment of the present invention is directed to a process for preparing an ink composition which comprises (a) forming a mixture by admixing water and polyphosphoric acid; (b) adding a colorant to the mixture; and (c) adjusting the pH of the mixture by adding a base thereto. The present invention also includes ink compositions prepared by these processes.

Ink compositions for ink jet printing are known. For example, U.S. Pat. No. 5,062,892 discloses ink jet ink compositions containing oxo-anions (phosphates, polyphosphates, phosphate esters, arsenate, molybdate, sulfate, sulfite, and oxalate) in an amount of from 9 milligrams per liter to 14 weight percent. The oxo anion additive is included in the ink to reduce kogation in the thermal ink jet printers.

Although known inks are suitable for their intended purposes, a need remains for improved ink compositions suitable for use in ink jet printing processes. In addition, there is a need for ink compositions which exhibit improved latency in ink jet printers. Further, there is a need for ink compositions which exhibit improved latency and which also exhibit acceptable waterfastness, pH, viscosity, and surface tension and generate high quality images. Additionally, there is a need for ink compositions with good latency and acceptable pH for which a wide range of solvents is available so that the ink composition can be tailored for compatibility with specific colorants, improved waterfastness, adjusted viscosity, adjusted surface tension, or other important ink characteristics. There is also a need for ink compositions with both improved latency and improved apparent dry times and/or penetration rates into substrates.

SUMMARY OF THE INVENTION

It is an object of the present invention to provide ink compositions with the above noted advantages.

It is another object of the present invention to provide improved ink compositions suitable for use in ink jet printing processes.

It is yet another object of the present invention to provide ink compositions which exhibit improved latency in ink jet printers.

It is still another object of the present invention to provide ink compositions which exhibit improved latency and which also exhibit acceptable waterfastness, pH, viscosity, and surface tension and generate high quality images.

Another object of the present invention is to provide ink compositions with good latency and acceptable pH for which a wide range of solvents is available so that the ink composition can be tailored for compatibility with specific colorants, improved waterfastness, adjusted viscosity, adjusted surface tension, or other important ink characteristics.

Yet another object of the present invention is to provide ink compositions with both improved latency and improved apparent dry times and/or penetration rates into substrates.

These and other objects of the present invention (or specific embodiments thereof) can be achieved by providing a process for preparing an ink composition which comprises admixing water, a colorant, a base, and polyphosphoric acid, wherein the pH of the ink is adjusted by a process selected from the group consisting of (a) adding polyphosphoric acid to an aqueous solution containing the base, and (b) adding the base to an aqueous solution containing polyphosphoric acid. Another embodiment of the present invention is directed to a process for preparing an ink composition which comprises (a) forming a mixture by admixing water and a base; (b) adding a colorant to the mixture; and (c) adjusting the pH of the mixture by adding polyphosphoric acid thereto. Yet another embodiment of the present invention is directed to a process for preparing an ink composition which comprises (a) forming a mixture by admixing water and polyphosphoric acid; (b) adding a colorant to the mixture; and (c) adjusting the pH of the mixture by adding a base thereto. The present invention also includes ink compositions prepared by these processes.

DETAILED DESCRIPTION OF THE INVENTION

The liquid vehicle of the inks of the present invention may consist of water, or it may comprise a mixture of water and a miscible organic component, such as ethylene glycol, propylene glycol, diethylene glycols, glycerine, dipropylene glycols, polyethylene glycols, polypropylene glycols, amides, ethers, carboxylic acids, esters, alcohols, organosulfides, organosulfoxides, sulfones, such as sulfolane, alcohol derivatives, carbitol, butyl carbitol, cellusolve, ether derivatives, amino alcohols, ketones, N-methylpyrrolidinone, 2-pyrrolidone, cyclohexylpyrrolidone, hydroxyethers, amides, sulfoxides, lactones, and other water miscible materials, as well as mixtures thereof. When mixtures of water and water miscible organic liquids are selected as the liquid vehicle, the water to organic ratio may be in any effective range, and typically is from about 100:0 to about 30:70, preferably from about 97:3 to about 50:50, although the ratio can be outside this range. The non-water component of the liquid vehicle generally serves as a humectant which has a boiling point higher than that of water (100° C.). In the inks of the present invention, the liquid vehicle (comprising water plus humectant) is generally present in an amount of from about 60 to about 99.5 percent by weight, and preferably from about 75 to about 99 percent by weight, although the amount can be outside of this range. In a particularly preferred embodiment of the present invention, the liquid vehicle comprises a mixture of water, 2-pyrrolidinone or N-methyl pyrrolidinone, and sulfolane, of the formula

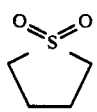

Preferably, the liquid vehicle comprises water in an amount of from about 80 to about 90 parts by weight, sulfolane in an amount of from about 5 to about 10 parts by weight, and 2-pyrrolidinone or N-methyl pyrrolidinone in an amount of from about 5 to about 10 parts by weight, although the relative amounts can be outside this range.

Inks of the present invention contain a colorant. Generally, the colorant is a dye. Preferred dyes are the anionic dyes. Specific examples include Bernacid Red 2BMN, Pontamine Brilliant Bond Blue A, BASF X-34, Pontamine, Food Black 2, Carodirect Turquoise FBL Supra Conc. (Direct Blue 199), available from Carolina Color and Chemical, Special Fast Turquoise 8GL Liquid (Direct Blue 86), available from Mobay Chemical, Intrabond Liquid Turquoise GLL (Direct Blue 86), available from Crompton and Knowles, Cibracron Brilliant Red 38-A (Reactive Red 4), available from Aldrich Chemical, Drimarene Brilliant Red X-2B (Reactive Red 56), available from Pylam, Inc., Levafix Brilliant Red E-4B, available from Mobay Chemical, Levafix Brilliant Red E-6BA, available from Mobay Chemical, Procion Red H8B (Reactive Red 31), available from ICI America, Pylam Certified D&C Red #28 (Acid Red 92), available from Pylam, Direct Brill Pink B Ground Crude, available from Crompton & Knowles, Cartasol Yellow GTF Presscake, available from Sandoz, Inc., Tartrazine Extra Conc. (FD&C Yellow #5, Acid Yellow 23), available from Sandoz, Carodirect Yellow RL (Direct Yellow 86), available from Carolina Color and Chemical, Cartasol Yellow GTF Liquid Special 110, available from Sandoz, Inc., D&C Yellow #10 (Acid Yellow 3), available from Tricon, Yellow Shade 16948, available from Tricon, Basacid Black X34, available from BASF, Carta Black 2GT, available from Sandoz, Inc., Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, available from Bayer, Procion Turquoise PA, Procion Turquoise HA, Procion Turquoise H-5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, available from ICI, Cibacron Red F-B, Cibacron Black BG, Lanasol Black B, Lanasol Red 5B, Lanasol Red B, and Lanasol Yellow 4G, available from Ciba-Geigy, Basilen Black P-BR, Basilen Yellow EG, Basilen Brilliant Yellow P-3GN, Basilen Yellow M-6GD, Basilen Brilliant Red P-3B, Basilen Scarlet E-2G, Basilen Red E-B, Basilen Red E-7B, Basilen Red M-5B, Basilen Blue E-R, Basilen Brilliant Blue P-3R, Basilen Black P-BR, Basilen Turquoise Blue P-GR, Basilen Turquoise M-2G, Basilen Turquoise E-G, and Basilen Green E-6B, available from BASF, Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, available from Sumitomo Chemical Company, Intracron Yellow C-8G, Intracron Red C-8B, Intracron Turquoise Blue GE, INtracon Turquoise HA, and Intracron Black RL, available from Crompton and Knowles, Dyes and Chemicals Division, and the like. Particularly preferred are dyes available from ICI Americas, Inc. of the chemical structure

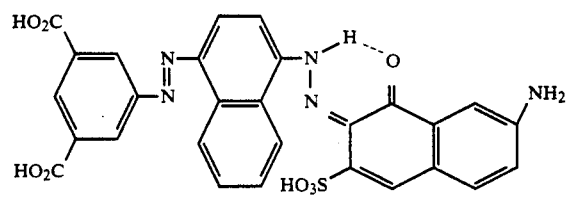

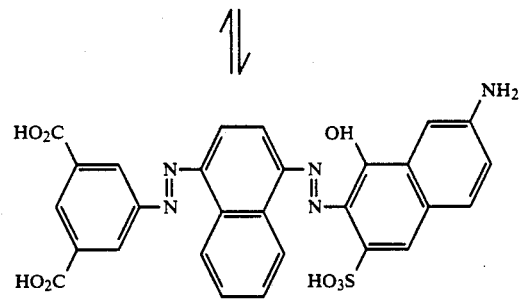

and those of the chemical structure

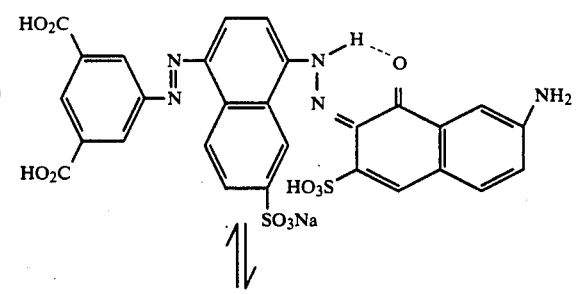

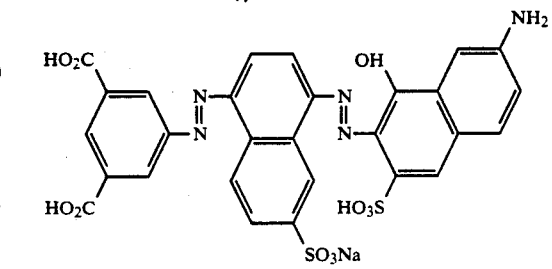

Also particularly preferred are BASF X-34 black dye (available from BASF) and Duasyn Brilliant Red F3B SF VP 218 (high purity solid, obtained from Hoechst, Coventry, R.I.). Dyes that are invisible to the naked eye but detectable when exposed to radiation outside the visible wavelength range (such as ultraviolet or infrared radiation), such as dansyl-lysine, N-(2-aminoethyl)-4-amino-3,6-disulfo-1,8-dinaphthalimide dipotassium salt, N-(2-aminopentyl)-4-amino-3,6-disulfo-1,8-dinaphthalimide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid, amide derivatives of 4,4'-diaminostilbene-2,2'-disulfonic acid, phenylurea derivatives of 4,4'-disubstituted stilbene-2,2'-disulfonic acid, mono- or di-naphthyltriazole derivatives of 4,4'-disubstituted stilbene disulfonic acid, derivatives of benzithiazole, derivatives of benzoxazole, derivatives of benziminazole, derivatives of coumarin, derivatives of pyrazolines containing sulfonic acid groups, 4,4'-bis(-triazin-2-ylamino)stilbene-2,2'-disulfonic acids, 2-(stilben-4-yl)naphthotriazoles, 2-(4-phenylstilben-4-yl)benzoxazoles, 4,4-bis(triazo-2-yl)stilbene-2,2'-disulfonic acids, 1,4-bis(styryl)biphenyls, 1,3-diphenyl-2-pyrazolines, bis(benzazol-2-yl) derivatives, 3-phenyl-7-(triazin-2-yl)coumarins, carbostyrils, naphthalimides, 3,7-diaminodibenzothiophen-2,8-disulfonic acid-5,5-dioxide, other commercially available materials, such as C.I. Fluorescent Brightener No. 28 (C.I. 40622), the fluorescent series Leucophor B-302, BMB (C.I. 290), BCR, BS, and the like (available from Leucophor), and the like, are also suitable. The dye is present in the ink composition in any effective amount, typically from about 1 to about 20 percent by weight, and preferably from about 2 to about 10 percent by weight (wherein the amount refers to the amount of dye molecules present in the ink), although the amount can be outside of this range. A mixture of dyes in the proportions desired to obtain a specific shade may also be employed.

In addition, the colorant for the ink compositions of the present invention can be a pigment, or a mixture of one or more dyes and/or one or more pigments. The pigment can be black, cyan, magenta, yellow, red, blue, green, brown, mixtures thereof, and the like. Examples of suitable black pigments include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as CI 60710, CI Dispersed Red 15, a diazo dye identified in the Color Index as CI 26050, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 0.1 micron. The pigment is present in the ink composition in any effective amount, generally from about 1 to about 7 percent by weight and preferably from about 2 to about 5 percent by weight, although the amount can be outside of this range.

Ink compositions of the present invention are buffered to the desired pH by the addition of polyphosphoric acid and a base. Polyphosphoric acid is believed to be of the formula

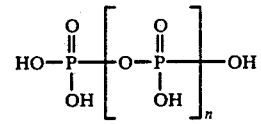

wherein n is an integer of at least about 1, preferably from about 1 to about 20, and more preferably from about 1 to about 4, although the value can be outside these ranges. The polyphosphoric acid employed may also contain a mixture of materials in which n has varying values, including 0. For example, the polyphosphoric acid may include a mixture of monophosphoric acid, diphosphoric acid, triphosphoric acid, and tetraphosphoric acid. In addition, the polyphosphoric acid can be in the cyclic form, and cyclic forms of polyphosphoric acid can be included in mixtures with acyclic mono- and polyphosphoric acids as well. Polyphosphoric acid is commercially available from a number of suppliers, such as Aldrich, Milwaukee, Wis. The polyphosphoric acid is added to the ink composition in an amount of at least about 0.1 percent by weight of the ink, preferably from about 0.1 to about 10 percent by weight, and more preferably from about 0.5 to about 5 percent by weight, although the amount can be outside these ranges.

The base can be any suitable base which forms an effective buffer system in the ink in combination with the polyphosphoric acid. Preferably, the base is sufficiently volatile to leave the liquid vehicle as the ink dries. Examples of suitable bases include ammonia, ammonium hydroxide, methylamine, dimethylamine, trimethylamine, ethylamine, diethylamine, triethylamine, ethylene diamine, and the like, as well as mixtures thereof. The base is added to the ink composition in any effective amount. For example, for a base which is an ammonium hydroxide solution in water (61% NH$_4$OH), typical amounts are at least about 0.1 percent by weight of the ink, preferably from about 0.1 to about 5.0 percent by weight, and more preferably from about 0.3 to about 1.0 percent by weight, although the amount can be outside these ranges. For bases of higher molecular weight, proportionally greater amounts can be used. The amount of base present can also be expressed in terms of the number of molar equivalents of base per molar equivalent of dye in the ink. Typically, the amount of base is at least about 0.5 molar equivalents per molar equivalent of dye, preferably from about 0.5 to about 25 molar equivalents of base per molar equivalent of dye, preferably from about 2 to about 10 molar equivalents of base per molar equivalent of dye, although the amount can be outside these range.

The various ink ingredients can be admixed with each other in any desired order. For example, the base can be admixed with water, followed by addition of polyphosphoric acid, followed by addition of the colorant. Or, the base and the colorant can be admixed with water, followed by addition of polyphosphoric acid. Or, polyphosphoric acid can be admixed with water, followed by addition of the base, followed by addition of the colorant. Or, polyphosphoric acid and the colorant can be admixed with water, followed by addition of the base. Any additional ink ingredients, such as solvents, humectants, biocides, or the like, can be added at any desired stage of the ink preparation process.

The buffer system comprising the polyphosphoric acid and the base enables the ink composition to be adjusted to a stable desired pH, generally within a range of from about 6.5 to about 10.0 and preferably from about 7.5 to about 9.0, although the pH can be outside these ranges. Buffering the pH within these ranges is generally preferred to prevent possible precipitation of the dyes from the ink at pH values lower than about 6.5 and to prevent possible loss of waterfastness and sharp print quality at pH values higher than about 10.0.

The inks of the present invention, buffered with a combination of polyphosphoric acid and a base, exhibit improved latency compared to inks buffered with other acids. Latency is the period during which the ink jet printer may stop printing while it contains the ink and subsequently be restarted without clogging of the nozzle. Latency in general should be as high as possible to enable restarting of the ink jet printer after extended idle periods. In most thermal ink jet inks, the choice of ink components in addition to water and colorant, such as glycols or other humectants, determines the latency of the ink. In the inks of the present invention, however, the buffer system enables improved latency; thus, the other ink ingredients can be selected to optimize other important ink characteristics such as waterfastness, viscosity, surface tension, or the like, all of which affect print quality. While not being limited to any particular theory, it is believed that some latency difficulties can arise when salts from an ink buffer system crystallize in or over the nozzles in an ink jet printhead. Crystallization can be reduced or eliminated by selecting ink components which will maintain these crystals in solution, but these ink components may eventually evaporate, leaving the crystals behind to block the nozzles. The combination of polyphosphoric acid and base in the present invention, however, exhibits minimal tendencies to dry up or crystallize, and enables ink jet printers containing the ink which have been idle for extended periods to restart and jet acceptably with the first pulse. In addition, the combination of polyphosphoric acid and base in the present invention enhances the waterfastness of the ink. Again, while not being limited to any particular theory, it is believed that the polyphosphoric acid component in the ink resists crystallization because of the difficulty it would encounter in obtaining the proper geometry for crystal lattice packing.

Other additives can also be present in the inks of the present invention. For example, one or more surfactants or wetting agents can be added to the ink. These additives may be of the cationic, anionic, or nonionic types. Suitable surfactants and wetting agents include sodium lauryl sulfate, Tamol ® SN, Tamol ® LG, those of the Triton ® series available from Rohm and Haas Company, those of the Marasperse ® series, those of the Igepal ® series available from GAF Company, those of the Tergitol ® series, and other commercially available surfactants. These surfactants and wetting agents are present in effective amounts, generally from 0 to about 15 percent by weight, and preferably from about 0.01 to about 8 percent by weight, although the amount can be outside of this range.

Polymeric additives can also be added to the inks of the present invention to enhance the viscosity of the ink and the stability of the pigment particles and to reduce the rate of agglomeration and precipitation of the particles. Water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, and the like are particularly useful for stabilizing pigment particles in a water based liquid vehicle such as water or a mixture of water and a water miscible organic liquid. Polymeric stabilizers may be present in the ink of the present invention in amounts of from 0 to about 10 percent by weight, and preferably from about 0.01 to about 5 percent by weight, although the amount can be outside of this range.

One preferred additive to the inks of the present invention is a polymeric additive consisting of two polyalkylene oxide chains bound to a central bisphenol-A moiety. This additive is of the formula

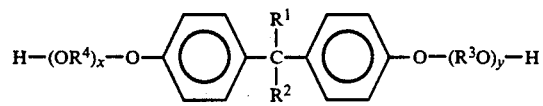

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide/bisphenol-A polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in *Polyethers*, N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.*, C25(3), 325–373 (1985), the disclosures of each of which are totally incorporated herein by reference. The polyalkylene oxide/bisphenol-A additive is generally present in the ink in an amount of at least about 1 part per million. Typically, the polyalkylene oxide/bisphenol-A additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in copending application U.S. Ser. No. 07/738,021, entitled "Ink Compositions for Ink Jet Printing," with the named inventor William M. Schwarz, filed Jul. 30, 1991, the disclosure of which is totally incorporated herein by reference.

Ink compositions of the present invention can also contain as optional additives polyamine compounds. Examples of suitable polyamine additives include N,N'-bis(3-aminopropyl)-1,2-ethylenediamine, 1,4-bis(3-aminopropyl)piperazine, N,N'-bis(3-aminopropyl)-1,3-propanediamine, N,N'-bis(2-aminoethyl)-1,3-propanediamine, N,N'-bis(3-aminopropyl)-1,4-butanediamine, ethylenediamine, diethylenetriamine, triethylenetetramine, tetraethylenepentamine, nitrilotrisethylamine, N,N'-(diaminoethyl)piperazine, piperazinylethylethylenediamine, aminoethyltriethylenetetramine, aminoethylpiperazinylethylethylenediamine, piperazinylethyldiethylenetriamine, pentaethylenehexamine, and the like, as well as mixtures thereof. These materials are commercially available from a variety of sources, including Aldrich Chemical Company, Milwaukee, Wis., Texaco, Inc., Houston, Tex., and Bayer (Canada) Inc., Point Claire, PQ. polyamine or mixture of polyamines can be present in any effective or desired amount, typically from about 0.001 to about 5 percent by weight of the ink composition, preferably from about 0.01 to about 3 percent by weight of the ink composition, and more preferably from about 0.4 to about 2.0 percent by weight, although the amount can be outside of these ranges.

Other optional additives to the inks of the present invention include biocides such as Dowicil 150, 200, and 75, benzoate salts, sorbate salts, and the like, present in an amount of from about 0.0001 to about 4 percent by weight, and preferably from about 0.01 to about 2.0 percent by weight, additional pH controlling agents such as acids or bases, phosphate salts, carboxylates salts, sulfite salts, amine salts, and the like, present in an amount of from 0 to about 1 percent by weight and preferably from about 0.01 to about 1 percent by weight, or the like.

The ink compositions of the present invention are generally of a viscosity suitable for use in thermal ink jet printing processes. Typically, the ink viscosity is no more than about 5 centipoise, and preferably is from about 1 to about 2.5 centipoise.

Ink compositions of the present invention can be prepared by any suitable process. Typically, the inks are prepared by simple mixing of the ingredients. One process entails mixing all of the ink ingredients together and filtering the mixture to obtain an ink. Inks of the present invention can be prepared by preparing a conventional ink composition according to any desired process, such as by mixing the ingredients, heating if desired, and filtering, followed by adding the acid and base pH adjusting components of the present invention to the mixture and mixing at room temperature with moderate shaking until a homogeneous mixture is obtained, typically from about 5 to about 10 minutes. Alternatively, the ink additives of the present invention can be mixed with the other ink ingredients during the ink preparation process, which takes place according to any desired procedure, such as by mixing all the ingredients, heating if desired, and filtering.

The present invention is also directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. Any suitable substrate can be employed, including plain papers such as Xerox ® 4024 papers, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink composition was prepared as follows. To 550 grams of water were added 10 grams of N,N'-bis(3-aminopropyl)-1,2-ethylenediamine (obtained from BASF) and 9.5 grams of ammonium hydroxide (aqueous solution containing 61.4 percent by weight ammonium hydroxide). The resulting solution was stirred for 5 minutes, after which the pH was 11.79. Thereafter, an aqueous solution of 50 percent by weight polyphosphoric acid (obtained from Aldrich, Milwaukee, Wis.) was added to the solution in sufficient amount (19.7 grams) to lower the pH to 9.40. Thereafter, 100 grams of urea was added and the solution was stirred for an additional 5 minutes. Subsequently, 110 grams of N- methyl pyrrolidinone (obtained from BASF) and 82.4 grams of sulfolane (obtained from BASF) were added, and the solution was stirred for an additional 5 minutes. Duasyn Brilliant Red F3B SF VP218 dye (obtained from Hoechst) in an amount of 2.37 grams was then added and the solution was roll milled for 5 minutes. Thereafter, 83.7 grams of Basacid X-34 black dye (obtained from BASF) was added, and the solution was stirred for 15 minutes, after which the pH was 9.11. To this solution was then added an aqueous solution of 50 percent by weight polyphosphoric acid in an amount (8.35 grams) sufficient to reduce the pH to 8.20. Also added at this time were 1.0 gram of Dowicil 150 biocide (obtained from Dow Chemical), 0.5 gram of a polyethylene oxide/bisphenol-A polymer of the formula

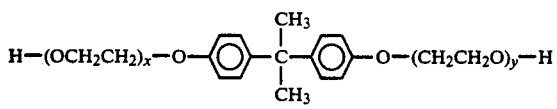

with a molecular weight of 18,000 (obtained from Polysciences, Inc.), and additional water (6.54 grams). The mixture was stirred for 30 minutes and then filtered through a 142 millimeter, 20 micron mylaflow filter with 20 pounds per square inch of positive pressure applied to enhance filtration. The resulting ink has a viscosity of 2.18 centipoise, a surface tension of 47.0 dynes per square centimeter, a conductivity of 7.90 millimhos per centimeter, and a pH of 8.30.

EXAMPLE II

An ink composition was prepared as follows. To 600 grams of water were added 2.5 grams of N,N'-bis(3-aminopropyl)-1,2-ethylenediamine (obtained from BASF) and 3.5 grams of ammonium hydroxide (aqueous solution containing 61.4 percent by weight ammonium hydroxide). The resulting solution was stirred for 5 minutes, after which the pH was 11.34. Thereafter, an aqueous solution of 50 percent by weight polyphosphoric acid (obtained from Aldrich, Milwaukee, Wis.) was added to the solution in sufficient amount (6.2 grams) to lower the pH to 9.01. Thereafter, 50 grams of urea was added and the solution was stirred for an additional 5 minutes. Subsequently, 30 grams of N-methyl pyrrolidinone (obtained from BASF) and 41.3 grams of sulfolane (obtained from BASF) were added, and the solution was stirred for an additional 5 minutes. Duasyn Brilliant Red F3B SF VP218 dye (obtained from Hoechst) in an amount of 3.0 grams was then added and the solution was roll milled for 5 minutes. Thereafter, 105.6 grams of Basacid X-34 black dye (obtained from BASF) was added, and the solution was stirred for 15 minutes, after which the pH was 8.25. To this solution was then added an aqueous solution of 50 percent by weight polyphosphoric acid in an amount (1.72 grams) sufficient to reduce the pH to 7.80. Also added at this time were 1.0 gram of Dowicil 150 biocide (obtained from Dow Chemical), 0.25 gram of a polyethylene oxide/bisphenol-A polymer with a molecular weight of 18,000 (obtained from Polysciences, Inc.), and additional water (118.5 grams). The mixture was stirred for 30 minutes and then filtered through a 142 millimeter, 20 micron mylaflow filter with 20 pounds per square inch of positive pressure applied to enhance filtration. The resulting ink had a surface tension of 52.8 dynes per square centimeter, a conductivity of 9.04 millimhos per centimeter, and a pH of 7.80.

EXAMPLE III

An ink composition was prepared as follows. To 700 grams of water were added 2.5 grams of N,N'-bis(3-aminopropyl)-1,2-ethylenediamine (obtained from BASF) and 3.5 grams of ammonium hydroxide (aqueous solution containing 61.4 percent by weight ammonium hydroxide). The resulting solution was stirred for 5 minutes, after which the pH was 11.60. Thereafter, an aqueous solution of 50 percent by weight polyphosphoric acid (obtained from Aldrich, Milwaukee, Wis.) was added to the solution in sufficient amount (6.8 grams) to lower the pH to 9.00. Subsequently, 30 grams of N-methyl pyrrolidinone (obtained from BASF) and 41.3 grams of sulfolane (obtained from BASF) were added, and the solution was stirred for an additional 5 minutes. Duasyn Brilliant Red F3B SF VP218 dye (obtained from Hoechst) in an amount of 3.63 grams was then added and the solution was roll milled for 5 minutes. Thereafter, 128.3 grams of Basacid X-34 black dye (obtained from BASF) was added, and the solution was stirred for 15 minutes, after which the pH was 7.89. To this solution was then added an aqueous solution of 50 percent by weight polyphosphoric acid in an amount (0.34 grams) sufficient to reduce the pH to 7.80. Also added at this time were 1.0 gram of Dowicil 150 biocide (obtained from Dow Chemical), 0.25 gram of a polyethylene oxide/bisphenol-A polymer with a molecular weight of 18,000 (obtained from Polysciences, Inc.), and additional water (52.6 grams). The mixture was stirred for 30 minutes and then filtered. The resulting ink had a viscosity of 1.34 centipoise, a surface tension of 53.8 dynes per square centimeter, a conductivity of 9.80 millimhos per centimeter, and a pH of 7.90.

EXAMPLE IV

An ink composition was prepared as follows. To 700 grams of water were added 2.5 grams of N,N'-bis(3-aminopropyl)-1,2-ethylenediamine (obtained from BASF) and 3.5 grams of ammonium hydroxide (aqueous solution containing 61.4 percent by weight ammonium hydroxide). The resulting solution was stirred for 5 minutes, after which the pH was 11.40. Thereafter, an aqueous solution of 50 percent by weight polyphosphoric acid (obtained from Aldrich, Milwaukee, Wis.) was added to the solution in sufficient amount (6.6 grams) to lower the pH to 8.98. Subsequently, 30 grams of N-methyl pyrrolidinone (obtained from BASF) and 41.2 grams of sulfolane (obtained from BASF) were added, and the solution was stirred for an additional 5 minutes. Duasyn Brilliant Red F3B SF VP218 dye (obtained from Hoechst) in an amount of 2.37 grams was then added and the solution was roll milled for 5 minutes. Thereafter, 83.7 grams of Basacid X-34 black dye (obtained from BASF) was added, and the solution was stirred for 15 minutes, after which the pH was 8.03. To this solution was then added an aqueous solution of 50 percent by weight polyphosphoric acid in an amount (0.97 grams) sufficient to reduce the pH to 7.80. Also added at this time were 1.0 gram of Dowicil 150 biocide (obtained from Dow Chemical), 0.25 gram of a polyethylene oxide/bisphenol-A polymer with a molecular weight of 18,000 (obtained from Polysciences, Inc.), and additional water (50 grams). The mixture was stirred for 30 minutes and then filtered under 20 pounds per square inch positive pressure through a 142 millimeter 20 micron nylaflow filter. The resulting ink had a viscosity of 1.26 centipoise, a surface tension of 53.7 dynes per square centimeter, a conductivity of 8.33 millimhos per centimeter, and a pH of 7.90.

EXAMPLE V

An ink composition was prepared as follows. To 450 grams of water were added 5.0 grams of N,N'-bis(3-aminopropyl)-1,2-ethylenediamine (obtained from BASF) and 9.5 grams of ammonium hydroxide (aqueous solution containing 61.4 percent by weight ammonium hydroxide). The resulting solution was stirred for 5 minutes. Thereafter, an aqueous solution of 50 percent by weight polyphosphoric acid (obtained from Aldrich, Milwaukee, Wis.) was added to the solution in sufficient amount (16.0 grams) to lower the pH to 9.5. Thereafter, 100 grams of urea was added and the solution was stirred for an additional 5 minutes. Subsequently, 110 grams of N-methyl pyrrolidinone (obtained from BASF) and 123.6 grams of sulfolane (obtained from BASF) were added, and the solution was stirred for an additional 5 minutes. Duasyn Brilliant Red F3B SF VP218 dye (obtained from Hoechst) in an amount of 3.63 grams was then added and the solution was roll milled for 5 minutes. Thereafter, 128.3 grams of Basacid X-34 black dye (obtained from BASF) was added, and the solution was stirred for 15 minutes. To this solution was then added an aqueous solution of 50 percent by weight polyphosphoric acid in an amount (1.06 grams) sufficient to reduce the pH to 8.7. Also added at this time were 1.0 gram of Dowicil 150 biocide (obtained from Dow Chemical), 0.5 gram of a polyethylene oxide/bisphenol-A polymer with a molecular weight of 18,000 (obtained from Polysciences, Inc.), and additional water (49.6 grams). The mixture was stirred for 30 minutes and then filtered through a 142 millimeter, 20 micron nylaflow filter with 20 pounds per square inch of positive pressure applied to enhance filtration. The resulting ink had a viscosity of 2.37 centipoise, a surface tension of 51.0 dynes per square centimeter, a conductivity of 6.2 millimhos per centimeter, and a pH of 8.72.

EXAMPLE VI

Additional inks were prepared by processes similar to those described in Examples I through V with the following contents (amounts are percentage by weight, with the balance being water):

| Ink | NH$_4$OH | urea | NMP | sulfolane | N-BAPED | PEO | dye | pH |
| --- | --- | --- | --- | --- | --- | --- | --- | --- |
| 1 | 0.35 | — | 3 | 4 | 0.25 | 0.025 | 3.0 | 7.8 |
| 2 | 0.65 | — | 7 | 8 | 0.50 | 0.025 | 3.8 | 8.2 |
| 3 | 0.95 | — | 11 | 12 | 1.0 | 0.025 | 4.6 | 8.7 |
| 4 | 0.65 | 5.0 | 3 | 4 | 0.50 | 0.025 | 4.6 | 8.7 |
| 5 | 0.95 | 5.0 | 7 | 8 | 1.0 | 0.025 | 3.0 | 7.8 |
| 6 | 0.35 | 5.0 | 11 | 12 | 0.25 | 0.025 | 3.8 | 8.2 |
| 7 | 0.95 | 10.0 | 3 | 8 | 0.25 | 0.025 | 4.6 | 8.2 |
| 8 | 0.35 | 10.0 | 7 | 12 | 0.50 | 0.025 | 3.0 | 8.7 |
| 9 | 0.65 | 10.0 | 11 | 4 | 1.0 | 0.025 | 3.8 | 7.8 |
| 10 | 0.65 | — | 3 | 12 | 1.0 | 0.05 | 3.0 | 8.2 |
| 11 | 0.95 | — | 7 | 4 | 0.25 | 0.05 | 3.8 | 8.7 |
| 12 | 0.35 | — | 11 | 8 | 0.50 | 0.05 | 4.6 | 7.8 |
| 13 | 0.35 | 5.0 | 3 | 8 | 1.0 | 0.05 | 3.8 | 8.7 |
| 14 | 0.65 | 5.0 | 7 | 12 | 0.25 | 0.05 | 4.6 | 7.8 |
| 15 | 0.95 | 5.0 | 11 | 4 | 0.50 | 0.05 | 3.0 | 8.2 |
| 16 | 0.95 | 10.0 | 3 | 12 | 0.50 | 0.05 | 3.8 | 7.8 |
| 17 | 0.35 | 10.0 | 7 | 4 | 1.0 | 0.05 | 4.6 | 8.2 |
| 18 | 0.65 | 10.0 | 11 | 8 | 0.25 | 0.05 | 3.0 | 8.7 |

The inks were each incorporated into a Hewlett-Packard DeskJet printer and jetted. The inks were tested for latency at 15% and 90% relative humidity by measuring the amount of time for which the printer could remain idle with ink in the nozzles followed by starting up the printer with no clogging of the nozzles:

| Ink | Latency (seconds) 15% RH | 90% RH |
| --- | --- | --- |
| 1 | 80 | 77 |
| 2 | 55 | 75 |
| 3 | 30 | 30 |
| 4 | 40 | 40 |
| 5 | 40 | 75 |
| 6 | 120 | 130 |
| 7 | 95 | 100 |
| 8 | 205 | 250 |
| 9 | 80 | 95 |
| 10 | 40 | 20 |
| 11 | 75 | 70 |
| 12 | 50 | 100 |
| 13 | 75 | 80 |
| 14 | 100 | 120 |
| 15 | 110 | 95 |
| 16 | 195 | 200 |
| 17 | 10 | 20 |
| 18 | 220 | 95 |

Other embodiments and modifications of the present invention may occur to those skilled in the art subsequent to a review of the information presented herein, these embodiments and modifications, as well as equivalents thereof, are also included within the scope of this invention.

What is claimed is:

1. A process for preparing an ink composition which comprises (a) forming a mixture by admixing water and a base; (b) adding a colorant to the mixture; and (c) adjusting the pH of the mixture by adding polyphosphoric acid thereto.

2. A process according to claim 1 wherein the colorant is a dye.

3. A process according to claim 1 wherein the ink also contains a polyamine.

4. A process according to claim 1 wherein the ink also contains sulfolane and a member selected from the group consisting of N-methyl pyrrolidone and 2-pyrrolidone.

5. A process according to claim 1 wherein the base is selected from the group consisting of ammonia, ammonium hydroxide, methylamine, dimethylamine, trimethylamine, ethylamine, diethylamine, triethylamine, ethylene diamine, and mixtures thereof.

6. A process according to claim 1 wherein the base is ammonium hydroxide.

7. A process according to claim 1 wherein the base is present in the ink in an amount of at least about 0.1 percent by weight.

8. A process according to claim 2 wherein the base is present in the ink in an amount of at least about 0.5 molar equivalents per molar equivalent of dye.

9. A process according to claim 1 wherein the polyphosphoric acid is added to the ink an amount of at least about 0.1 percent by weight of the ink.

10. A process according to claim 1 wherein the polyphosphoric acid is added to the ink in an amount of from about 0.1 to about 10 percent by weight.

11. A process according to claim 1 wherein the pH of the ink is adjusted to a value of from about 6.5 to about 10.0.

12. A process according to claim 1 wherein the ink also contains an additive of the formula

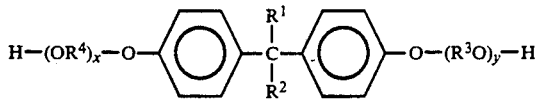

wherein $R^1$ and $R^2$ are independently selected from the group consisting of hydrogen, alkyl groups with from 1 to about 8 carbon atoms, and alkoxy groups with from 1 to about 8 carbon atoms, $R^3$ and $R^4$ are independently selected from the group consisting of alkyl groups with from 1 to about 4 carbon atoms, and x and y are each independently a number of from about 100 to about 400.

13. An ink composition prepared by the process of claim 1.

14. A process which comprises incorporating into an ink jet printing apparatus an ink composition according to claim 13 and causing droplets of the ink composition to be ejected in an imagewise pattern onto a substrate.

15. A process according to claim 14 wherein the ink is selectively heated in an imagewise pattern, thereby causing droplets of the ink to be ejected in an imagewise pattern.

* * * * *